(12) United States Patent
Chen et al.

(10) Patent No.: US 7,466,461 B2
(45) Date of Patent: Dec. 16, 2008

(54) MULTI-PURPOSE SCAN DEVICE USING THE SAME POWER SOURCE

(75) Inventors: Chi-Yao Chen, Hsin Chu (TW); Hsien-Chi Lin, Pao-Shan Hsiang (TW)

(73) Assignee: Avision Inc. (TW)

( * ) Notice: Subject to any disclaimer, the term of this patent is extended or adjusted under 35 U.S.C. 154(b) by 1011 days.

(21) Appl. No.: 10/856,795

(22) Filed: Jun. 1, 2004

(65) Prior Publication Data

US 2005/0030596 A1  Feb. 10, 2005

(30) Foreign Application Priority Data

Aug. 8, 2003  (TW)  ............... 92121913 A

(51) Int. Cl.
*H04N 1/04*  (2006.01)
(52) U.S. Cl. ............ 358/474; 358/496; 358/414; 358/497; 358/498; 399/362; 399/367; 318/685; 318/696
(58) Field of Classification Search ........... 358/474, 358/496, 505, 401, 501, 412, 414, 419, 497; 358/498; 382/312, 318; 399/362, 367; 250/234, 250/235, 236; 355/407, 84; 271/3.14, 8.1, 271/278; 318/685, 696
See application file for complete search history.

(56) References Cited

U.S. PATENT DOCUMENTS 5,153,738 A * 10/1992 Stemmle ............. 358/497
5,914,791 A * 6/1999 Lin .................. 358/498
5,956,152 A * 9/1999 Yamada et al. ........... 358/412
6,366,343 B1 * 4/2002 Lee ................. 355/84
6,600,578 B1 * 7/2003 Huang ............... 358/474
6,903,848 B2 * 6/2005 Kirita ............... 358/474
6,982,815 B2 * 1/2006 Tsutsumi ............ 358/474
6,992,800 B2 * 1/2006 Honbo et al. ........... 358/498
7,154,639 B2 * 12/2006 Chien ............... 358/474
2004/0145783 A1 * 7/2004 Murray ............... 358/497

FOREIGN PATENT DOCUMENTS

TW  468912  11/1988
TW  522929   5/1991

* cited by examiner

*Primary Examiner*—David K Moore
*Assistant Examiner*—Henry Dahbour

(57) ABSTRACT

A multi-purpose scan device using the same power source includes a flatbed scanner, an ADF, a motor, and a power-switching mechanism. The flatbed scanner has a scanning module and a power transmission mechanism for moving the scanning module back and forth in the flatbed scanner. The ADF has a sheet-feeding mechanism for feeding a document across the scanning module, which scans the document. The power-switching mechanism selectively transmits power of the motor to the sheet-feeding mechanism and the power transmission mechanism.

2 Claims, 6 Drawing Sheets

MULTI-PURPOSE SCAN DEVICE USING THE SAME POWER SOURCE

This Non-provisional application claims priority under 35 U.S.C. § 119 (a) on Patent Application No(s). 092121913 filed in Taiwan on Aug. 8, 2003, the entire contents of which are hereby incorporated by reference.

BACKGROUND OF THE INVENTION

1. Field of the Invention

The invention relates to a multi-purpose scan device using the same power source, and more particular to a multi-purpose scan device constituted by a flatbed scanner and an ADF, both of which use the same power source.

2. Description of the Related Art

A conventional multi-purpose scan device is constituted by a flatbed scanner and an ADF (Automatic Document Feeder). A single document may be scanned using the flatbed scanner having a first scanning module, while a lot of documents may be scanned using the ADF in conjunction with the flatbed scanner. In addition, if a second scanning module is further installed in the ADF, the user may utilize the combination of the ADF and the flatbed scanner to perform a duplex scan on the document. Because the combination of the ADF and the flatbed scanner is capable of performing the flatbed scan operations, the sheet-fed scan operations, and the duplex scan operations, the scan device of the invention is thus defined as a multi-purpose scan device.

FIG. 1 is a schematic illustration showing a conventional multi-purpose scan device. Referring to FIG. 1, the conventional multi-purpose scan device 100 includes a flatbed scanner 110 and an ADF 120. The flatbed scanner 110 includes a housing 111, a scan window 112, a scanning module 113, a guiding rod 114, a motor 115, and a transmission element 116. The motor 115 usually moves the scanning module 113 back and forth along the guiding rod 114 in the housing 111 with the transmission element 116 such as a belt so as to perform the flatbed scan operation for scanning the document placed on the scan window 112.

The ADF 120 has a housing 121, a sheet input tray 122, a plurality of sheet-feeding rollers 123, and a motor 124. The motor 124 rotates the sheet-feeding rollers 123 so as to perform the sheet-fed scan operation for scanning the document that is originally placed on the sheet input tray 122 and then moved across the scanning module 113. If the ADF 120 includes a second scanning module (not shown), the multi-purpose scan device 100 may perform the duplex scan operation for scanning two sides of the document.

Therefore, the conventional multi-purpose scan device 100 has two motors 115 and 124 and needs two sets of motor controllers to control the operations of the two motors. Such the controller cost is increased accordingly. Moreover, the weight of the overall multi-purpose scan device 100 is also increased due to the additional set of the motor and the motor controller, thereby causing inconvenience in transportation.

SUMMARY OF THE INVENTION

It is therefore an object of the invention to provide a multi-purpose scan device, which uses a single motor as the power source so as to reduce the manufacturing cost and the weight thereof.

The invention achieves the above-identified object by providing a multi-purpose scan device using the same power source. The scan device includes a flatbed scanner, an ADF, a motor, and a power-switching mechanism. The flatbed scanner has a scanning module and a power transmission mechanism for moving the scanning module back and forth in the flatbed scanner. The ADF has a sheet-feeding mechanism for feeding a document across the scanning module, which scans the document. The power-switching mechanism selectively transmits power of the motor to the sheet-feeding mechanism and the power transmission mechanism.

Using the same motor to drive the sheet-feeding mechanism and the power transmission mechanism may effectively reduce the weight of the scan device as well as the costs of the motors and controllers.

DETAILED DESCRIPTION OF THE INVENTION

Figure 1:
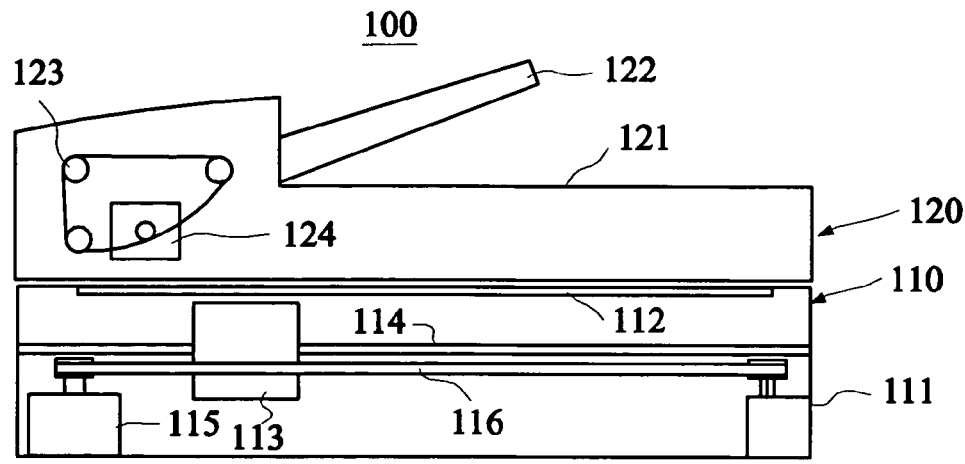
FIG. 1 is a schematic illustration showing a conventional multi-purpose scan device.
Figure 2:
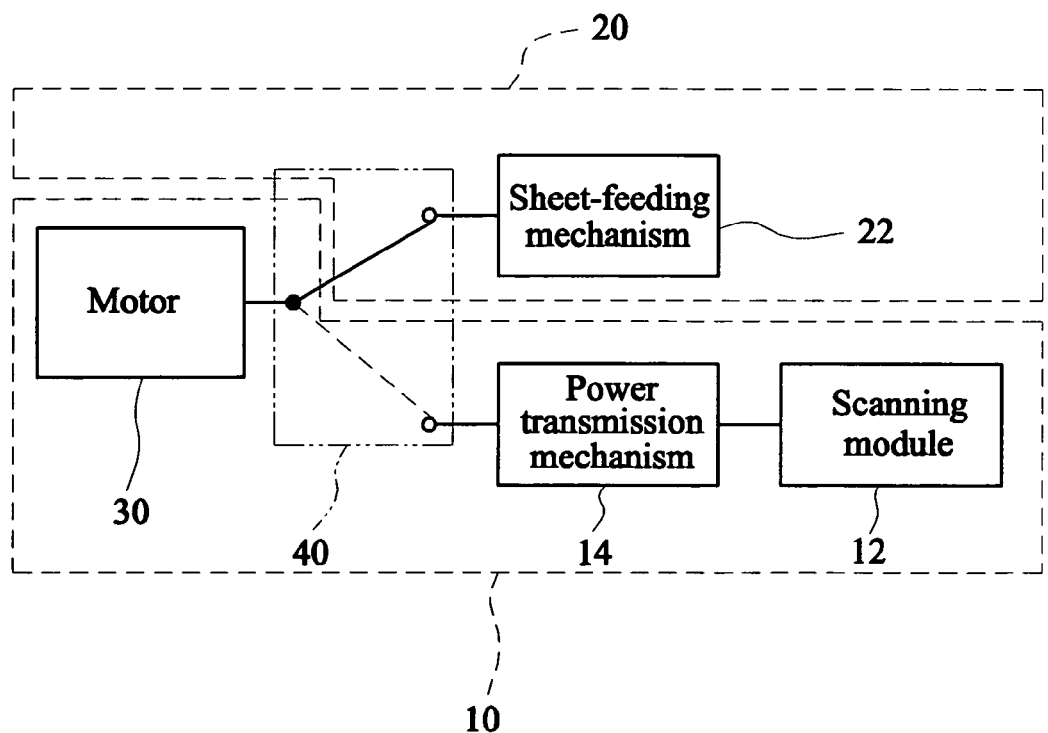
FIG. 2 is a schematic illustration showing the power transmission of the multi-purpose scan device according to the first embodiment of the invention.

FIG. 2 is a schematic illustration showing the power transmission of the multi-purpose scan device according to the first embodiment of the invention. Referring to FIG. 2, the multi-purpose scan device using the same power source of this embodiment includes a flatbed scanner 10, an ADF (Automatic Document Feeder) 20, a motor 30, and a power-switching mechanism 40. The flatbed scanner 10 has a scanning module 12 and a power transmission mechanism 14 for moving the flatbed scanner 10 back and forth in the scanning module 12. The user may place a document on a glass window 11 (FIG. 8) of the flatbed scanner 10, and the flatbed scan operation for scanning the document may be performed with the movement of the scanning module 12.

The ADF 20 has a sheet-feeding mechanism 22 for feeding a document across the scanning module 12, which scans the document. The user may place a stack of documents on a sheet input tray 90 (FIG. 8) of the ADF 20, which feeds the documents one by one across a scanning area for the scanning module 12 to perform the sheet-fed scan operation. In addition, the ADF 20 may further include a stationary scanning module (not shown) for performing the duplex sheet-fed scan operation in conjunction with the scanning module 12. Thus, the above-mentioned multi-purpose scan device may perform the flatbed, sheet-fed, and duplex sheet-fed scan operations.

The motor 30 is installed in the flatbed scanner 10. The power-switching mechanism 40 selectively transmits the power of the motor 30 to the sheet-feeding mechanism 22 and the power transmission mechanism 14. Therefore, the multi-purpose scan device can utilize the same motor 30 to perform the flatbed and sheet-fed scan operations.

Figure 3:
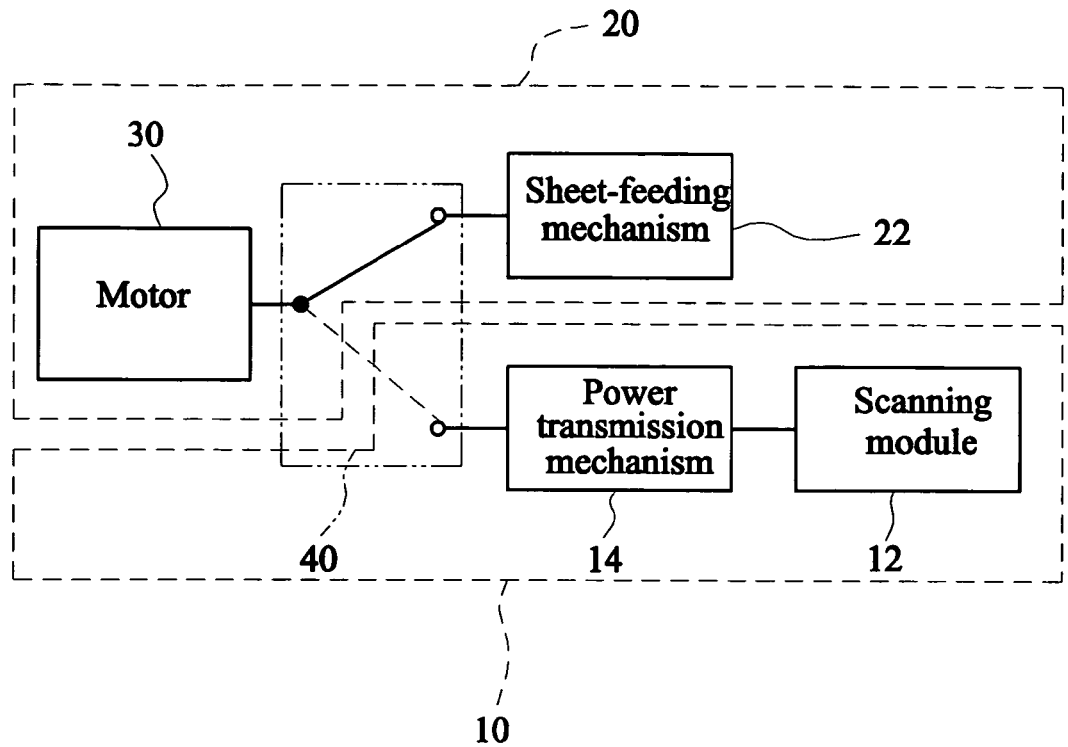
FIG. 3 is a schematic illustration showing the power transmission of the multi-purpose scan device according to the second embodiment of the invention.

FIG. 3 is a schematic illustration showing the power transmission of the multi-purpose scan device according to the second embodiment of the invention. This embodiment is similar to the first embodiment but differs from the first embodiment in that the motor 30 is installed in the ADF 20.

Figure 4:
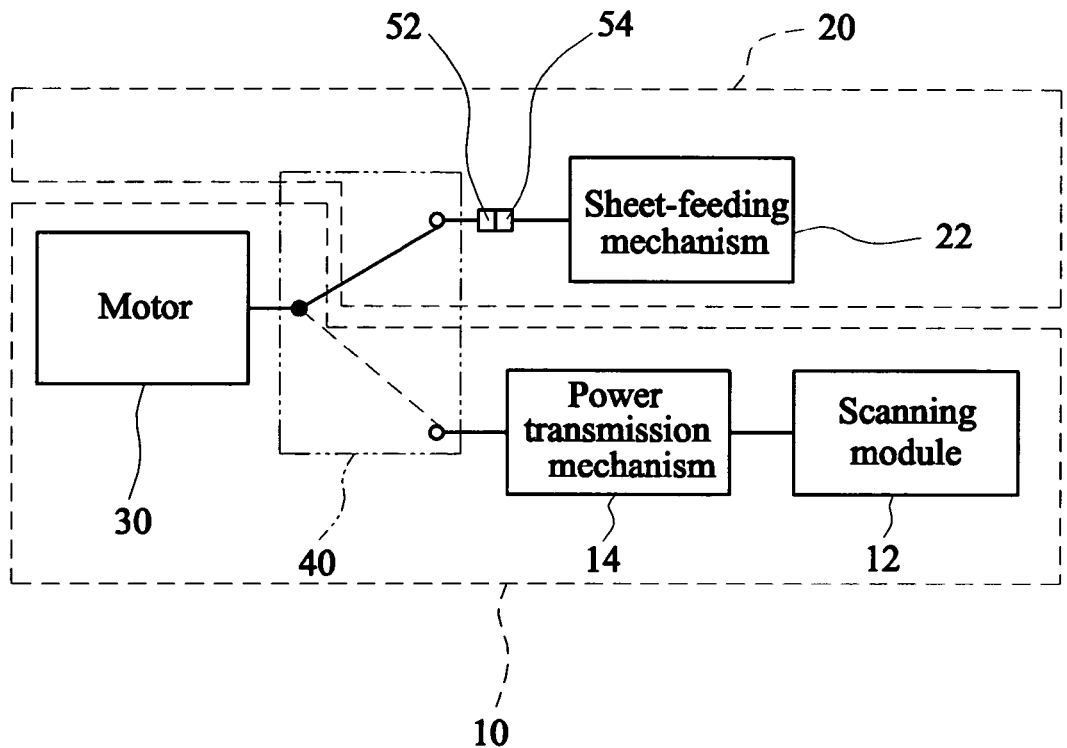
FIG. 4 is a schematic illustration showing the power transmission of the multi-purpose scan device according to the third embodiment of the invention.

FIG. 4 is a schematic illustration showing the power transmission of the multi-purpose scan device according to the third embodiment of the invention. This embodiment is similar to the first embodiment but differs from the first embodiment in that the multi-purpose scan device further includes a power outputting element 52 and a power receiving element 54, both of which may be combined into an assembly, such as a coupling, capable of transmitting the power. The power outputting element 52 outputs the power of the motor 30 transmitted from the power-switching mechanism 40. The power receiving element 54 coupled to the power outputting element 52 receives the power of the motor coming from the power outputting element 52 and drives the sheet-feeding mechanism 22 with the received power.

Similarly, when the motor 30 is installed in the ADF 20, the power outputting element 52 may output the power of the motor 30 transmitted from the power-switching mechanism 40. The power receiving element 54 coupled to the power outputting element 52 is for receiving the power of the motor coming from the power outputting element 52 to drive the power transmission mechanism 14 and thus the scanning module 12. According to such a design, the flatbed scanner 10 and the ADF 20 may also be designed as individual assemblies, and detail description thereof will be described with reference to FIGS. 6 and 7.

Figure 5:
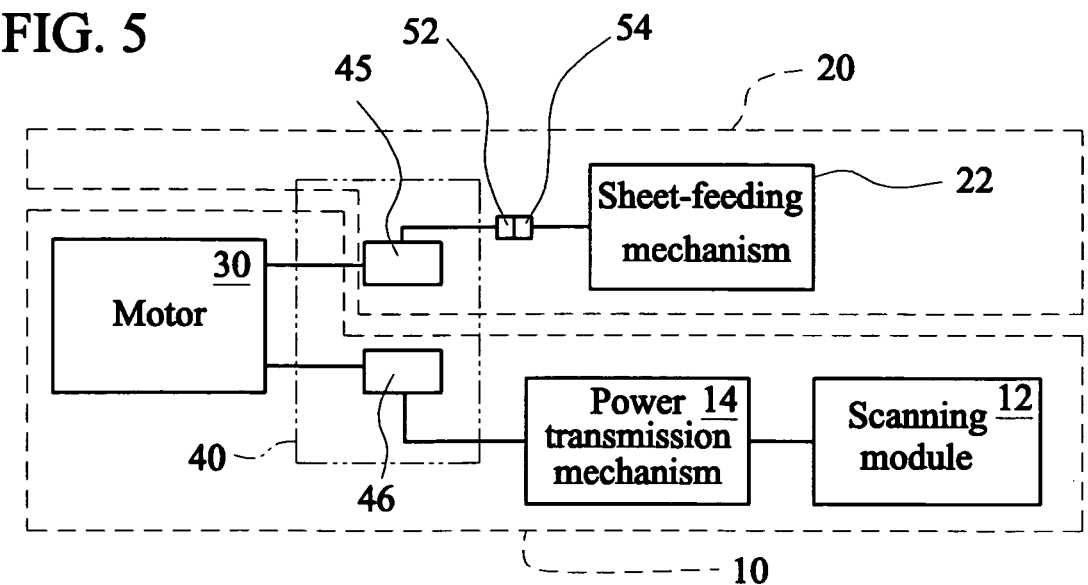
FIG. 5 is a schematic illustration showing the power transmission of the multi-purpose scan device according to the fourth embodiment of the invention.

FIG. 5 is a schematic illustration showing the powertransmission of the multi-purpose scan device according to the fourth embodiment of the invention. This embodiment is similar to the third embodiment but differs from the third embodiment in that the power-switching mechanism 40 of the multi-purpose scan device includes a first electromagnetic clutch 45 and a second electromagnetic clutch 46. The first electromagnetic clutch 45 is for selectively transmitting the power of the motor 30 to the sheet-feeding mechanism 22, and the second electromagnetic clutch 46 is for selectively transmitting the power of the motor 30 to the power transmission mechanism 14. Controlling the power on or off status of the electromagnetic clutch can control whether or not the power is transmitted out through the electromagnetic clutch.

Figure 6:
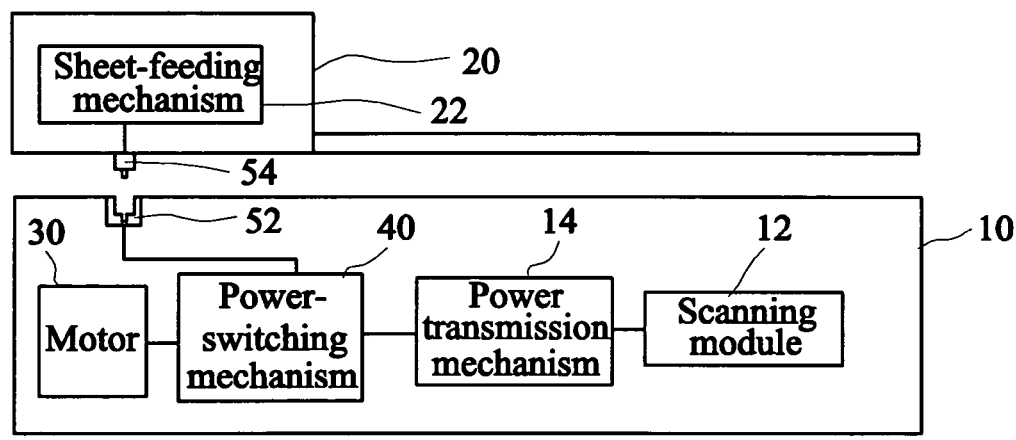
FIG. 6 is a schematic illustration showing the power transmission of the multi-purpose scan device according to the fifth embodiment of the invention.

FIG. 6 is a schematic illustration showing the power transmission of the multi-purpose scan device according to the fifth embodiment of the invention. As shown in FIG. 6, the ADF 20 and the flatbed scanner 10 may be designed into individual assemblies, which may be combined through the connection of power outputting element 52 and the power receiving element 54. Consequently, it would simplify the maintenance and cleaning process of the flatbed scanner 10 or ADF 20. In this embodiment, both the motor 30 and the power-switching mechanism 40 are installed in the flatbed scanner 10.

Figure 7:
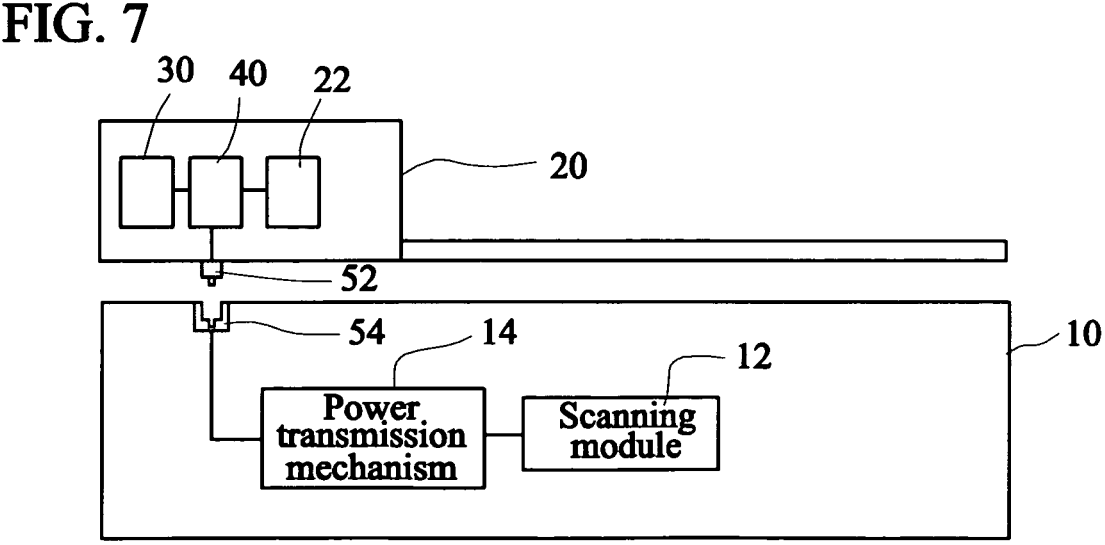
FIG. 7 is a schematic illustration showing the power transmission of the multi-purpose scan device according to the sixth embodiment of the invention.

FIG. 7 is a schematic illustration showing the powertransmission of the multi-purpose scan device according to the sixth embodiment of the invention. This embodiment is similar to the fifth embodiment but differs from the fifth embodiment in that the motor 30 and the power-switching mechanism 40 are installed in the ADF 20.

The practicability of the invention will be described with reference to a configuration of a practical power transmission mechanism.

Figure 8:
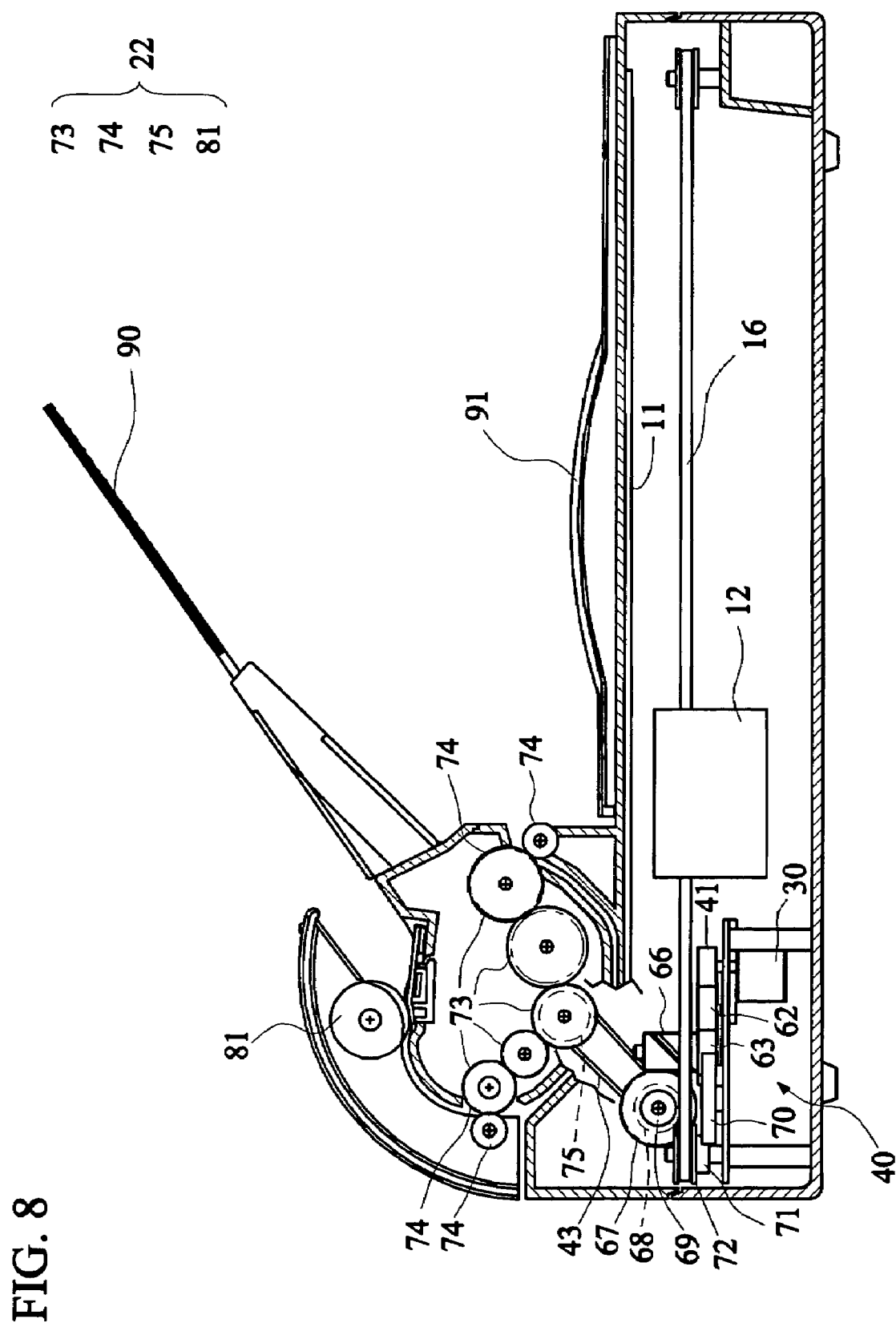
FIG. 8 is a schematic illustration showing the multi-purpose scan device of FIG. 2.
Figure 9:
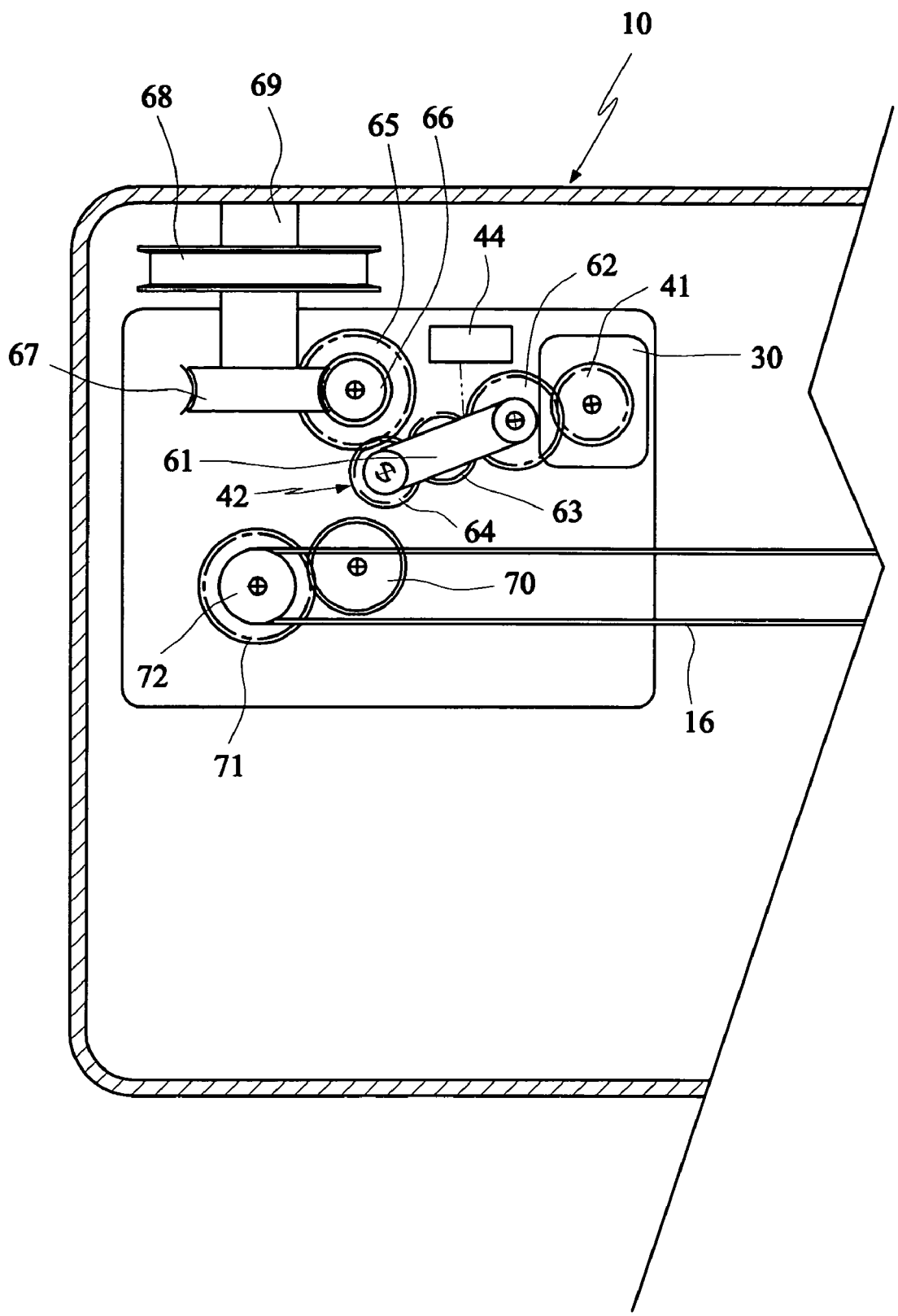
FIG. 9 is a first schematic illustration showing the power-switching mechanism of the multi-purpose scan device of FIG. 2.
Figure 10:
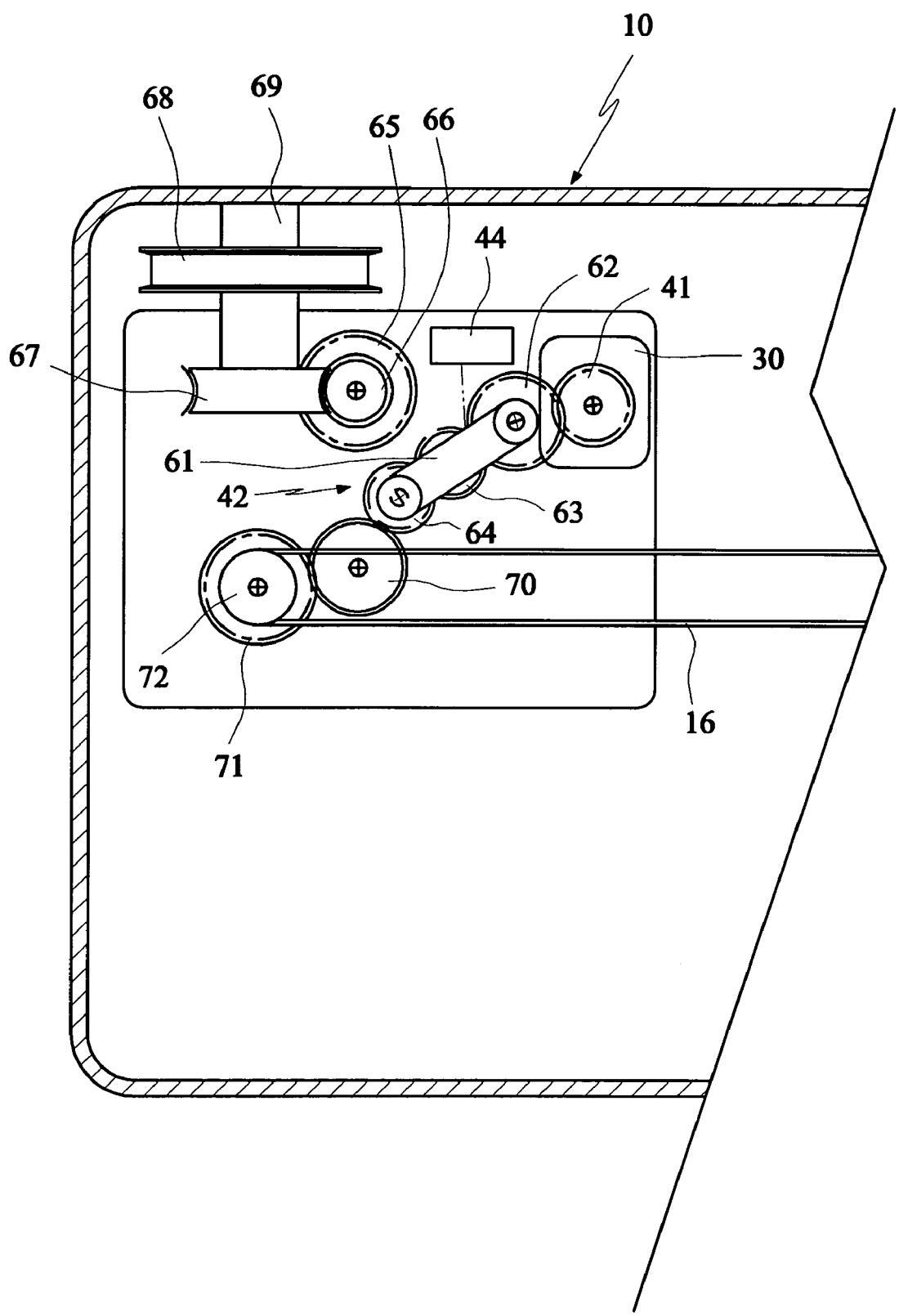
FIG. 10 is a second schematic illustration showing the power-switching mechanism of the multi-purpose scan device of FIG. 2.

FIG. 8 is a schematic illustration showing the multi-purpose scan device of FIG. 2. FIGS. 9 and 10 are first and second schematic illustrations showing the power-switching mechanism of the multi-purpose scan device of FIG. 2. As shown in FIGS. 8 to 10, the motor 30 is installed in the flatbed scanner 10, and the document lid 91 may press upon the document placed on the glass window 11 for the scanning module 12 to perform the flatbed scan operation. The document also can be placed on the sheet input tray 90 for the multi-purpose scan device to perform the sheet-fed scan operation.

The power-switching mechanism 40 may broadly include a sun gear 41, a planetary gearset 42, a first gear 65 and a worm shaft 66 both rotating about the same axis, a worm wheel 67 and a first pulley 68 both attaching to the same shaft 69, a second gear 70, a third gear 71 and a second pulley 72 both rotating about the same axis, and an actuator 44.

The power-switching mechanism 40 may also narrowly include a planetary gearset 42 and an actuator 44, while other elements belong to the transmission system. The planetary gearset 42 receives the power coming from the motor 30. The actuator 44 may be a solenoid for driving a rocker arm 61 to swing and thus transmits the power of the motor 30 to the power transmission mechanism 14 or the sheet-feeding mechanism 22.

The sun gear 41 is rotated and driven by the motor 30. The planetary gearset 42 engages with the sun gear 41 and includes a rocker arm 61 capable of swinging and a plurality of gears 62, 63 and 64 rotatably attached to the rocker arm 61. The first gear 65 may engage with the gear 64 of the planetary gearset 42. The worm shaft 66 drives the worm wheel 67 to rotate, and the first pulley 68 drives the sheet-feeding mechanism 22 with a first belt 43. The second gear 70 may engage with the planetary gearset 42. The third gear 71 engages with the second gear 70, and the second pulley 72 drives the power transmission mechanism 14 with a second belt 16. The actuator 44 may be a solenoid for driving the rocker arm 61 to swing and enabling the planetary gearset 42 to engage with the first gear 65 or the second gear 70, as shown in FIGS. 9 and 10.

When the sheet-fed scan operation is performed, the scanning module 12 is moved to the scanning area with the power of the motor 30. Then, sheet-feeding mechanism 22 feeds the document from the sheet input tray 90 across the scanning area with the power of the motor 30, and the scanning module 12 scans the document moving across the scanning area. In this embodiment, the sheet-feeding mechanism 22 includes a sheet-input roller 81, a plurality of gears 73, a plurality of auxiliary rollers 74, and a third pulley 75, as shown in FIG. 8.

According to the structures of the above-mentioned embodiments, the multi-purpose scan device of the invention has the following advantages.

1. Because the flatbed scanner 10 and the ADF 20 share the same motor 30, the weight of the multi-purpose scan device may be reduced, a single control circuit for the motor 30 may be used, and the cost may be reduced accordingly.

2. The power outputting element 52 and the power receiving element 54 are configured such that the flatbed scanner 10 and the ADF 20 may be combined quickly. Alternatively, the flatbed scanner 10 also may be used in conjunction with the document lid or the ADF 20, which facilitates the diversification of the products and satisfies the demands of various users.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A multi-purpose scan device, comprising:

a flatbed scanner having a scanning module and a power transmission mechanism for moving the scanning module back and forth in the flatbed scanner;

an ADF (Automatic Document Feeder) having a sheet-feeding mechanism for feeding a document across the scanning module, which scans the document;

a motor; and a power-switching mechanism for selectively transmitting power of the motor to the sheet-feeding mechanism and the power transmission mechanism;

wherein the motor is installed in the flatbed scanner and the power-switching mechanism comprises:

a sun gear rotated and driven by the motor;

a planetary gearset engaging with the sun gear and comprising a rocker arm capable of swinging and a plurality of gears rotatably attached to the rocker arm;

a first gear and a worm shaft both rotating about the same axis, wherein the first gear may engage with the planetary gearset;

a worm wheel and a first pulley both rotating about the same axis, wherein the worm shaft drives the worm wheel to rotate, and the first pulley drives the sheet-feeding mechanism with a first belt;

a second gear that may engage with the planetary gearset;

a third gear and a second pulley both rotating about the same axis, wherein the third gear engages with the second gear, and the second pulley drives the power transmission mechanism with a second belt; and an actuator for driving the rocker arm to swing and thus enable the planetary gearset to engage with the first gear or the second gear.

2. The multi-purpose scan device according to claim 1, wherein the actuator is a solenoid.

* * * * *